United States Patent [19]
Doragh

[11] Patent Number: 5,341,499
[45] Date of Patent: Aug. 23, 1994

[54] METHOD AND APPARATUS FOR PROCESSING MULTIPLE FILE SYSTEM SERVER REQUESTS IN A DATA PROCESSING NETWORK

[75] Inventor: Philip H. Doragh, Boca Raton, Fla.

[73] Assignee: International Business Machines Corporation, Armonk, N.Y.

[21] Appl. No.: 862,162

[22] Filed: Apr. 2, 1992

[51] Int. Cl.$^5$ .............................................. G06F 15/16
[52] U.S. Cl. .................................... 395/700; 395/650; 364/DIG. 1; 364/242.94; 364/282.4
[58] Field of Search ................. 395/650, 700, 200, 600

[56] References Cited

U.S. PATENT DOCUMENTS

| | | | |
|---|---|---|---|
| 4,825,354 | 4/1989 | Agrawal et al. | 364/200 |
| 4,887,204 | 12/1989 | Johnson et al. | 364/200 |
| 4,961,224 | 10/1990 | Yung | 380/25 |
| 5,121,483 | 6/1992 | Monahan et al. | 395/275 |
| 5,163,131 | 11/1992 | Row et al. | 395/200 |
| 5,218,695 | 6/1993 | Noveck et al. | 395/600 |
| 5,218,697 | 6/1993 | Chung | 396/650 |

OTHER PUBLICATIONS

H. M. Deitel, "Operating Systems", 1990, pp. 652, 653, 795, 808, 809.
K. Ravindran et al, "A Model of Naming for Fine-grained Service Specification in Distributed Systems"; May 1991 IEEE pp. 98–105.

*Primary Examiner*—Gareth D. Shaw
*Assistant Examiner*—Michael Richey
*Attorney, Agent, or Firm*—Steven W. Roth; Andrew J. Dillon

[57] ABSTRACT

Data processing systems often include multiple servers which provide facilities for other data stations within the system. A File System Driver loaded within an operating system is generally utilized to define the relationships among the operating system, the file systems and the device drivers. The method and system of the present invention loads multiple File System Drivers, each having a public entry point which may be utilized to identify each server device managed by an associated File System Driver. Thereafter, any server request by the user will result in an automatic sequential polling of each loaded File System Driver to identify the particular File System Driver which manages the server in question. In response to a failure to identify the particular File System Driver which manages the desired server, each File System Driver is polled a second time and permitted to transmit queries throughout the system to locate the desired server. In the depicted embodiment each File System Driver and associated servers are required to conform to and support the Universal Naming Convention (UNC) wherein servers and File System Drivers may be efficiently identified.

9 Claims, 3 Drawing Sheets

METHOD AND APPARATUS FOR PROCESSING MULTIPLE FILE SYSTEM SERVER REQUESTS IN A DATA PROCESSING NETWORK

BACKGROUND OF THE INVENTION

1. Technical Field:

The present invention relates in general to improvements in data processing systems and in particular to improvements in processing server requests in a data processing system. Still more particularly, the present invention relates to a method and system which permits concurrent processing of multiple server requests utilizing diverse servers without requiring a user to terminate and load an alternate File System Driver.

2. Description of the Related Art:

Distributed data processing systems are well known in the art. It is not uncommon for many thousands of personal computers, workstations and/or mainframe computers to be linked together in various topologies to form different types of networks. Examples of known networks include: Advance-Peer-To-Peer-Networks (APPN's); Local Area Networks (LAN's); Star Networks; Token-Ring Networks; Tree Networks, and many others. The flexibility of such networks is quite high and individual users may enjoy effective access to the assets of many different users within the network.

Often it is necessary or desirable to assign to an interface between separate sections of a network a higher capacity device which may be utilized to provide facilities for other users within the system. These higher capacity devices, known as servers, act as a control to permit files and applications in one area of the network to be accessed and utilized by other users. These servers are utilized by users within the network by means of File System Drivers (FSD's), sometimes referred to as an Installable File System (IFS) or a "redirector." A File System Driver is generally loaded as part of the configure system file and serves to define the relationships between the operating system, the file system and device drivers. The File System Driver constitutes code which converts general input/output requests by the user to requests which are recognized by a selected server. Thus, File System Drivers are generally designed to operate in conjunction with a particular server or class of servers.

In the prior art a user desiring to utilize a particular server device must ensure that the appropriate File System Driver has been loaded. Subsequently, if a user desires to utilize an alternate server it is necessary to reload the operating system and select an alternate File System Driver. Recently, the International Business Machines Corporation OS/2 Operating System Version 1.3 has demonstrated the utilization of dual File System Driver support. This operating system supports both the IBM Network File System Driver and the Novell Network File System Driver by changing all path-based API's kernel routines to permit failing calls for a server to one File System Driver to be automatically be sent to the alternate File System Driver. While this represents an increase in network efficiency, this approach only applies to the IBM/Novell File System Drivers and does not accommodate concurrent utilization of both File System Drivers.

It should therefore be apparent that a need exists for a method and system which permits the concurrent processing of multiple server requests utilizing diverse servers without requiring a user to terminate and load an alternate File System Driver.

SUMMARY OF THE INVENTION

It is therefore one object of the present invention to provide an improved data processing system.

It is another object of the present invention to provide an improved method for processing server requests in a data processing system.

It is yet another object of the present invention to provide an improved method and system which permits concurrent processing of multiple server requests utilizing diverse servers without requiring a user to terminate and load an alternate file system device.

The foregoing objects are achieved as is now described. Data processing systems often include multiple servers which provide facilities for other data stations within the system. A File System Driver loaded within an operating system is generally utilized to define the relationships among the operating system, the file systems and the device drivers. The method and system of the present invention loads multiple File System Drivers, each having a public entry point which may be utilized to identify each server device managed by an associated File System Driver. Thereafter, any server request by the user will result in an automatic sequential polling of each loaded File System Driver to identify the particular File System Driver which manages the server in question. In response to a failure to identify the particular File System Driver which manages the desired server, each File System Driver is polled a second time and permitted to transmit queries throughout the system to locate the desired server. In the depicted embodiment each File System Driver and associated servers are required to conform to and support the Universal Naming Convention (UNC) wherein servers and File System Drivers may be efficiently identified.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
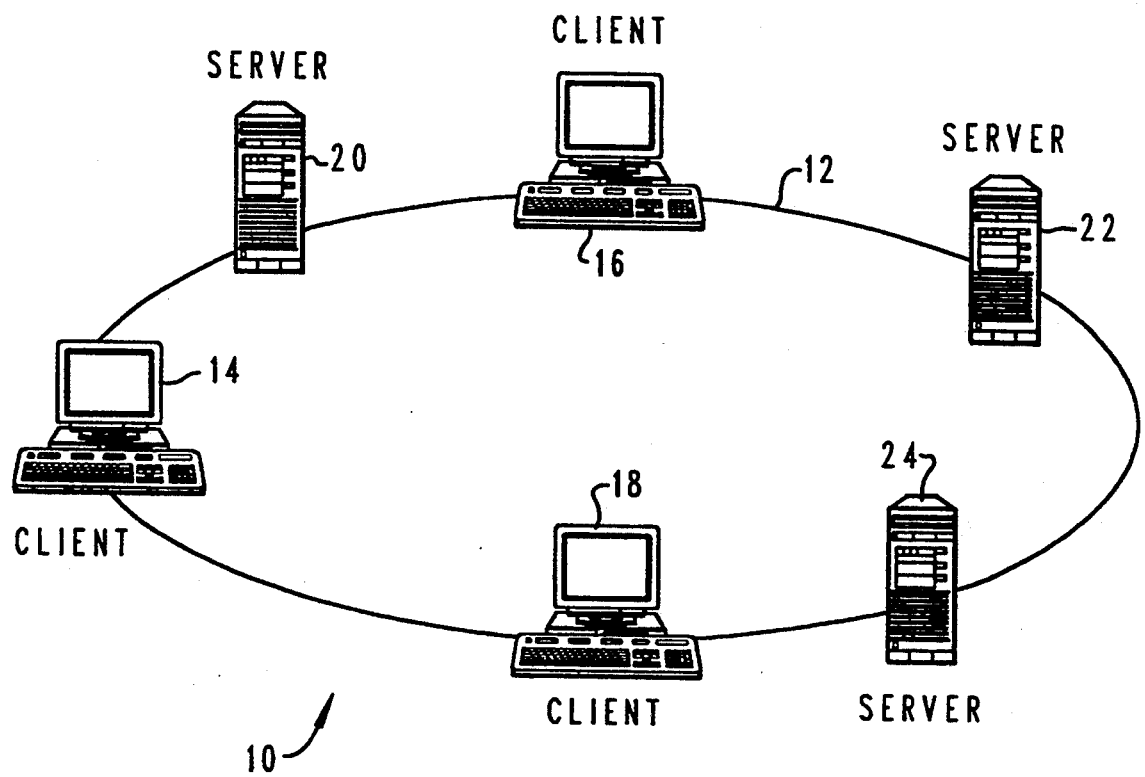
FIG. 1 is a pictorial representation of a data processing network which may be utilized to implement the method and system of the present invention.

With reference now to the figures and in particular with reference to FIG. 1, there is depicted a pictorial representation of a data processing network 10 which may be utilized to implement the method and system of the present invention. As illustrated, data processing system 10 includes multiple client users 14, 16 and 18 which are coupled together utilizing a loop 12. Also coupled to loop 12 are server devices 20, 22 and 24. In accordance with the depicted embodiment of the present invention each client user 14, 16 and 18 may constitute either a so-called "personal" computer, such as the International Business Machines Corporation PS/2 Personal Computer utilizing the OS/2 Operating System or any other suitable terminal device. Similarly, servers 20, 22 and 24 preferably constitute multiple diverse server devices, such as the International Business Machines Corporation LAN Server, the Novell, Inc. NetWare Server, and a third alternate server, such as Vines Network Server, marketed by Banyan Systems, Inc.

In data processing networks known in the prior art each client user within the network loads a File System Driver during initialization of the operating system for that user. The File System Driver loaded by the client user is typically designed to interact with a particular type of server, and thus server requests made by the client must necessarily be directed to that server. Therefore, in the event a client user desires to make a server request to a different server it is necessary for the operator of a client user computer to terminate operation of that computer and reload the operating system, including a different type of File System Driver. It should therefore be apparent that an increase in network efficiency may be accomplished by permitting each individual client user within data processing network 10 to support multiple File System Drivers wherein server requests for multiple diverse servers may be processed without the necessity of constantly terminating operation of the client user terminal to load a different File System Driver.

Figure 2:
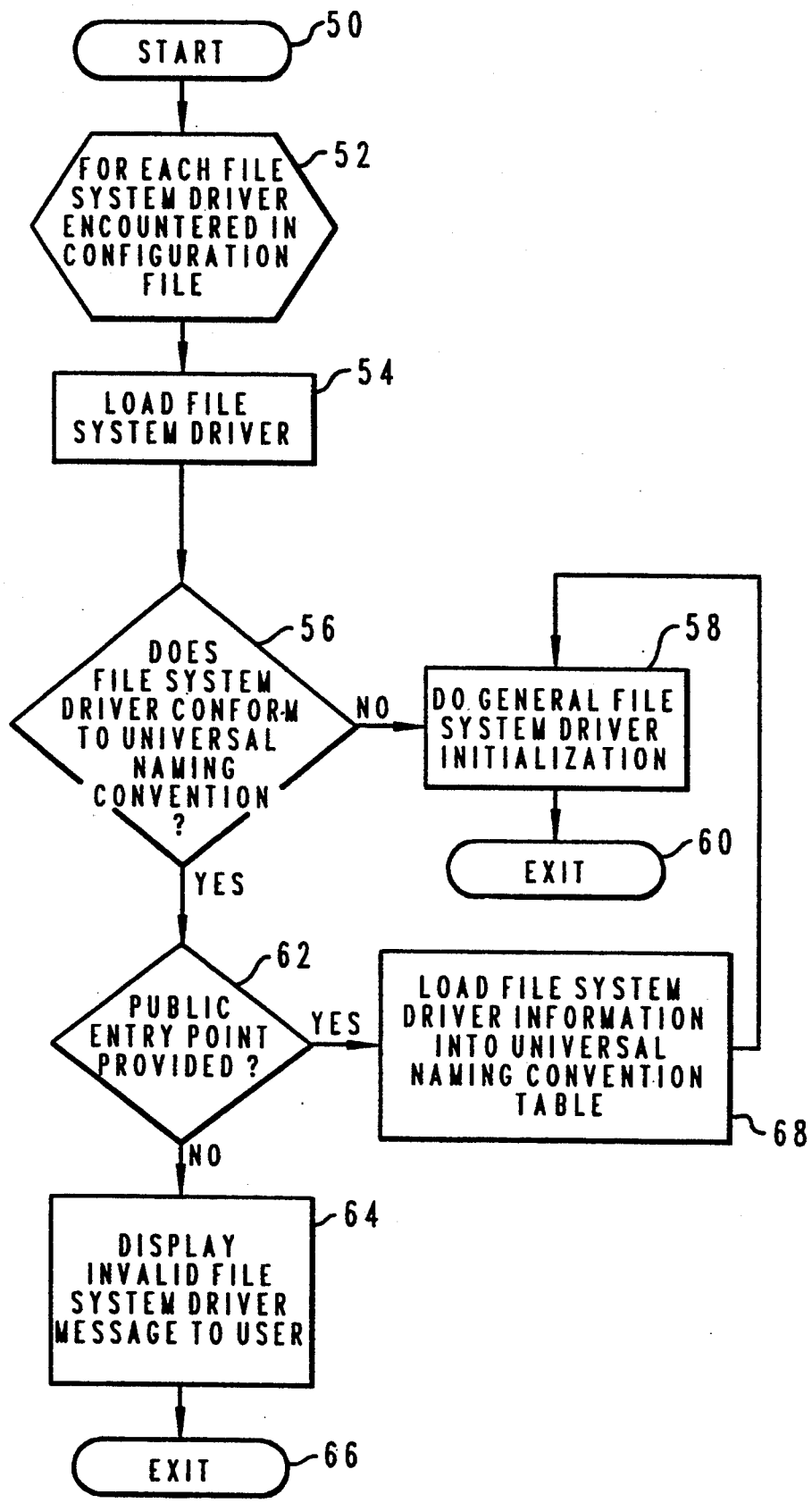
FIG. 2 is a high level logic flowchart which illustrates the initialization of a multiple File System Driver system in accordance with the method and system of the present invention.

Referring now to FIG. 2, there is depicted a high level logic flowchart which illustrates the initialization of a multiple File System Driver system in accordance with the method and system of the present invention. As illustrated, the process begins at block 50 and thereafter passes to block 52 which illustrates a repetitive process which is accomplished for each File System Driver which is encountered in the configuration file for a particular user. Thereafter, as each File System Driver is encountered, block 54 illustrates the loading of that File System Driver with the operating system for the user in question. Thereafter, the process passes to block 56.

Block 56 illustrates a determination of whether or not the File System Driver currently under consideration conforms to and supports the Universal Naming Convention. Those skilled in the art will appreciate that the Universal Naming Convention was jointly invented by IBM and Microsoft for use in their jointly developed Local Area Network (LAN) software products. Other companies like Novell implement the UNC in their products to allow third party DOS and OS/2 applications to request services from their servers.

In the event the File System Driver under consideration does not conform to and support the Universal Naming Convention the process passes to block 58. Block 58 illustrates the initialization of the File System Driver in accordance with well known prior art techniques and the process then terminates, as depicted at block 60.

Referring again to block 56, in the event the File System Driver under consideration does conform to and support the Universal Naming Convention, the process passes to block 62. Block 62 illustrates a determination of whether or not the File System Driver provides a public entry point which serves as an interface between the operating system kernel and the File System Driver. In accordance with an important feature of the present invention a public entry point must be provided for each File System Driver utilized in accordance with the method and system of the present invention which acts as an interface to a procedure which may be utilized to determine which servers are managed by the File System Driver under consideration.

In the event the appropriate public entry point is not provided, the process passes to block 64. Block 64 illustrates the displaying of an invalid File System Driver message to the user and the process then terminates, as depicted at block 66. The process terminates in the manner described above under the condition wherein a File System Driver does not provide a public entry point which may be utilized to determine what servers are managed by the File System Driver in question due to the requirement that the method and system of the present invention may not be practiced unless the File System Drivers may be polled, in the manner which will be described in detail herein, to determine what File System Drivers manage which servers within the data processing network.

Referring again to block 62, in the event the appropriate public entry point has been provided, information about the file system driver is loaded into a table which resides inside the operating system kernel. The name of the table that holds the critical information is called the "UNCFSCList." The list entry data structure for each File System Driver, in accordance with the method and system of the present invention, is:

```
/* This representation of a entry in the UNCFSCList is done in the */
/* "C" programming language for ease of understanding. */
struct uncfscentrstruc{
    unsigned long VPB_ID; /* Unique Volume Parameter Block_ID */,
    unsigned long FSC_ptr; /* pointer to the File System Control block */
    unsigned short hVPB; /* handle to VPB of interest */
    unsigned short Active; /* flag that entry contains valid info */
};
```

One version of the International Business Machines Corporation OS/2 Operating System includes four entires for this table; however, the number of entries within the table may be easily modified by simply modifying the public symbol "UNCFSCLast" which identifies the last entry of UNC table.

The public entry point which may be utilized to identify those servers managed by the File System Driver in question is provided by specifying an additional FS_ entry point into the OS/2 File System Driver Interface as follows:

```
/* This representation of the procedural entry point has been done */
/* in the "C" programming language for each of understanding. */
int far pascal FS_VERIFYUNCNAME (flag,pName)
    int far pascal FS_VERIFYUNCNAME (flag,pName)
    unsigned short flag; /* Flag telling if call is Pass 1 or 2 */
    char far * pName; /* pointer to the server path of interest */
```

Thus, a data processing system implemented in accordance with the method and system of the present invention will only load File System Drivers which conform to and support the Universal Naming Convention and which provide a public entry point as described which may be called by the operating system kernel as a result of an action taken through a standard input/output application programming interface.

Figure 3:
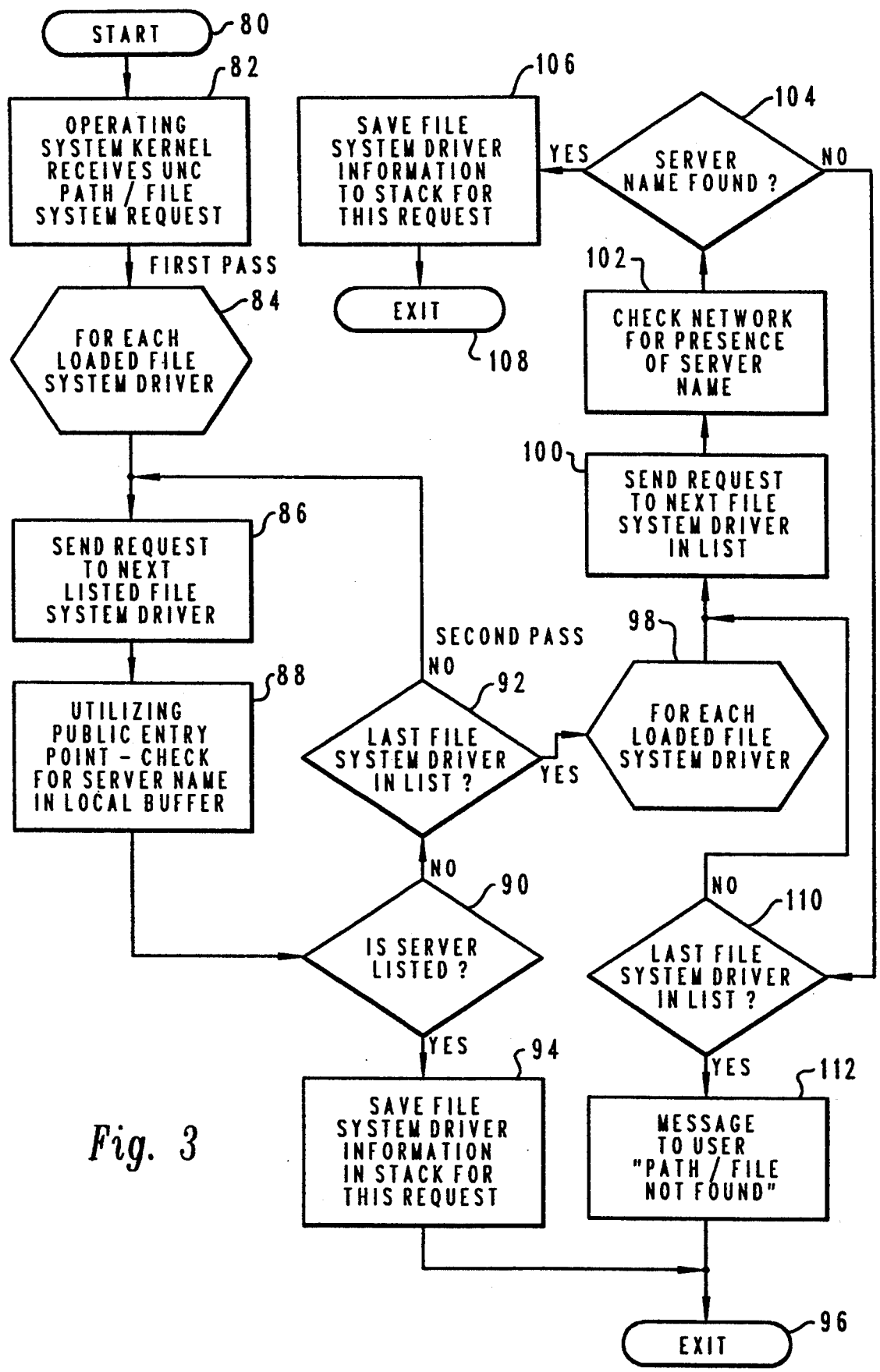
FIG. 3 is a high level logic flowchart which illustrates the processing of multiple server requests in accordance with the method and system of the present invention.

With reference now to FIG. 3, there is depicted a high level logic flowchart which illustrates the processing of multiple server requests in accordance with the method and system of the present invention. As illustrated, the process begins at block 80 and thereafter passes to block 82. Block 82 depicts the receipt by the operating system of a Universal Naming Convention path/file system request. Initially, this receipt of a system request will result in a first pass through the listed File System Drivers to determine whether or not the particular server required for the system request may be identified as a server managed by one of the loaded File System Drivers. This is accomplished, as illustrated at block 84, by a repetitive process which is utilized for each File System Driver which is loaded within the system. As depicted at block 86, the server request is passed to the initial or next listed File System Driver within the list of File System Drivers. Next, as depicted at block 88, by utilizing the aforementioned public entry point, a determination is made as to whether or not the server name in question is located within the local buffer of the File System Driver under consideration. If so, the process passes to block 90.

Block 90 illustrates a simple determination of whether or not the particular server required for the system request is listed within the local buffer of the File System Driver under consideration. If so, the process passes to block 94 which illustrates the saving of the File System Driver information in the stack for processing of this request. The procedure then exits, as depicted at block 96.

Referring again to block 90, in the event the server required for the system request under consideration is not listed within the local buffer of the File System Driver under consideration, the process passes to block 92. Block 92 illustrates a determination of whether or not the File System Driver under consideration is the last File System Driver within the list of loaded File System Drivers and if not, the process iteratively returns to block 86. Block 86, as described above, sends the request to the next listed File System Driver and the process repeats. Thus, during a first pass through the processing of a server request in accordance with the method and system of the present invention, each loaded File System Driver is examined, utilizing the public entry point provided, to determine whether or not the server required for the system request is managed by a particular File System Driver, as listed within a local buffer of that File System Driver.

Referring again to block 92, in the event the server in question is not listed within the local buffer of any loaded File System Driver, the second pass of the process is initiated. The procedure then passes from block 92 to block 98 whereupon a repetitive process for each loaded File System Driver is initiated. This process begins, as illustrated at block 100, by the transmittal of the request to the initial or next File System Driver within the list of loaded File System Drivers. Thereafter, the File System Driver is permitted to whatever is reasonable to locate the server in question. This includes the transmittal of "Are you there?" messages throughout the network. The process then passes to block 104.

Block 104 illustrates a determination of whether or not the particular server in question has been found utilizing this technique and if so, the process passes to block 106. Block 106 illustrates the saving of the File System Driver information for the File System Driver which manages the server which has been located and the process then passes to block 108 and exits.

Referring again to block 104, in the event the required server has not been located by this technique the process passes to block 110. Block 110 illustrates a determination of whether or not the File System Driver currently under consideration is the last File System Driver within the list and if not, the process returns to block 100 and the request is passed to the next File System Driver in the list. In this manner each File System Driver is permitted to take any necessary action to locate the particular server necessary to respond to the present system request. Referring again to block 110, in the event the File System Driver currently under consideration is the last File System Driver within the list of File System Drivers, the process passes to block 112. Block 112 illustrates the generation of a message to the user that the path/file which has been requested was not found. The process then passes to block 96 and exits.

Upon reference to the foregoing those skilled in the art will appreciate that by permitting the operating system to load multiple File System Drivers, each File System Driver including a public entry point which may be accessed to efficiently determine the identify of a server managed by that File System Driver a user may initiate multiple concurrent system requests which may be acted upon substantially concurrently by different servers within the data processing network. Alternately, the term "concurrently" may also be utilized to describe a situation in which the user may issue sequential system requests which are to be handled by different servers within the data processing network without requiring the user to terminate operation and load an alternate File System Driver. It should therefore be appreciated that the method and system of the present invention greatly enhances the efficiency of data processing systems by permitting a user to concurrently process multiple system requests utilizing diverse servers within a data processing network.

While the invention has been particularly shown and described with reference to a preferred embodiment, it will be understood by those skilled in the art that various changes in form and detail may be made therein without departing from the spirit and scope of the invention.

What is claimed is:

1. A method in a data processing network which includes multiple server devices which are connected to a client user within said data processing network for processing multiple server requests, said method comprising processing network implemented steps of:

loading a plurality of diverse file system drivers during the loading of an operating system within said client user;

providing a public entry point into each file system driver wherein an identification of each server device managed by an associated file system driver may be ascertained;

sequentially checking each of said plurality of file system drivers in response to a server request for a selected server wherein a particular file system driver within said client user which manages said selected server may be identified;

processing said server requests for said selected server utilizing said particular file system driver if said particular file system driver is identified; and searching said data processing network to locate said selected server in response to a failure to identify a particular file system driver which manages said selected server.

2. The method in a data processing network which includes multiple server devices which are connected to a client user within said data processing network for processing multiple server requests according to claim 1, wherein said step of loading a plurality of file system drivers during the loading of an operating system within said client user comprises the step of loading a plurality of file system drivers which conform to and support a Universal Naming Convention during the loading of an operating system within said user terminal.

3. The method in a data processing network which includes multiple server devices which are connected to a client user within said data processing network for processing multiple server requests according to claim 1, further including the step of returning an error message at said client user in response to an absence of said public entry point into any of said plurality of file system drivers.

4. A data processing network which includes multiple server devices which are connected to a client user within said data processing network which permits the concurrent processing of multiple server requests, said data processing network comprising:

a plurality of file system drivers;

means for loading said plurality of diverse file system drivers during loading of an operating system within said client user;

a public entry point within each of said file system drivers which may be utilized to identify each server device managed by an associated file system driver within said client user;

means for sequentially checking each of said file system driver utilizing an associated public entry point in response to a server request for a selected server wherein a particular file system driver which manages said selected server may be identified;

means for processing said server requests for said selected server utilizing said particular file system driver if said particular file system driver is identified; and means for searching said data processing network to locate said selected server in response to a failure to identify a particular file system driver which manages said selected server.

5. The data processing network which includes multiple server devices which are connected to a client user within said data processing network which permits the processing of multiple server requests according to claim 4, wherein said plurality of file system drivers comprises a plurality of file system drivers which conform to an support a Universal Naming Convention.

6. The data processing network which includes multiple server devices which are connected to a client user within said data processing network which permits the processing of multiple server requests according to claim 4, further including means for returning an error message at said client user in response to an absence of said public entry point within any of said plurality of file system drivers.

7. The data processing network which includes multiple server devices which are connected to a client user within said data processing network which permits the processing of multiple server requests according to claim 4, wherein said data processing system comprises a distributed data processing network including multiple client users.

8. The data processing network which includes multiple server devices which are connected to a client user within said data processing network which permits the processing of multiple server requests according to claim 7, wherein each of said multiple client users comprises a personal computer.

9. The data processing network which includes multiple server devices which are connected to a client user within said data processing network which permits the processing of multiple server requests according to claim 6, further including means for returning a message to said client user in response to a failure to identify a particular file system driver which manages said selected server.

* * * * *